United States Patent
Seifried

(10) Patent No.: US 9,742,269 B2
(45) Date of Patent: Aug. 22, 2017

(54) VOLTAGE CONTROL CIRCUIT FOR A FIELD DEVICE COUPLER

(71) Applicant: R. Stahl Schaltgeräte GmbH, Waldenburg (DE)

(72) Inventor: Michael Seifried, Schwäbisch Hall (DE)

(73) Assignee: R. STAHL SCHALTGERÄTE GMBH, Waldenburg (DE)

(*) Notice: Subject to any disclaimer, the term of this patent is extended or adjusted under 35 U.S.C. 154(b) by 0 days.

(21) Appl. No.: 14/939,614

(22) Filed: Nov. 12, 2015

(65) Prior Publication Data

US 2016/0141955 A1 May 19, 2016

(30) Foreign Application Priority Data

Nov. 13, 2014 (DE) .................. 10 2014 116 594

(51) Int. Cl.
*H02M 3/156* (2006.01)
*H02H 9/00* (2006.01)
(Continued)

(52) U.S. Cl.
CPC ............ *H02M 3/156* (2013.01); *H02H 9/008* (2013.01); *H02J 1/00* (2013.01)

(58) Field of Classification Search
CPC ........ H02M 3/155; H02M 3/156; H02M 1/32; Y02B 70/1425; Y02B 70/1466
See application file for complete search history.

(56) References Cited

U.S. PATENT DOCUMENTS 7,208,922 B2 * 4/2007 Kalfhaus .......... H02M 3/33569
323/222
7,915,759 B2 * 3/2011 Nishijima .......... H01F 17/0033
307/43
(Continued)

FOREIGN PATENT DOCUMENTS

DE 19910409 A1 11/1999
DE 102009005431 A1 7/2010
(Continued)

OTHER PUBLICATIONS

Search Report in corresponding German Application No. DE 10 2014 116 594.2, dated Jul. 8, 2015, 6 pages.

*Primary Examiner* — Gary L Laxton
(74) *Attorney, Agent, or Firm* — Fitch, Even, Tabin & Flannery LLP

(57) ABSTRACT

A voltage control circuit for electrically coupling a field device coupler to a bus line. An input voltage (UE) provided at the voltage control circuit by the bus line is converted into an output voltage (UA) that can be regulated and limited. If a current limitation is additionally provided, the "inherent safety" ignition protection type can be achieved. The voltage control circuit has a chopper-type regulator without galvanic isolation. A parallel path is formed parallel to the chopper-type regulator by a series connection of two buffer capacitors. Communication signals of higher frequency can be transmitted past the chopper-type regulator via the parallel path. The parallel path and a reference terminal of the chopper-type regulator are additionally connected via an impedance circuit to a reference potential at a second input terminal of the voltage control circuit.

20 Claims, 8 Drawing Sheets

(51) Int. Cl.
   *H02J 1/00* (2006.01)
   *H02M 1/32* (2007.01)

(56) References Cited

U.S. PATENT DOCUMENTS

| | | | |
|---|---|---|---|
| 7,982,333 B2* | 7/2011 | Wolf | H02H 7/067 |
| | | | 307/10.1 |
| 8,242,901 B2 | 8/2012 | Indefrey et al. | |
| 9,509,372 B2 | 11/2016 | Seifried | |
| 2006/0068242 A1* | 3/2006 | Norimatsu | H01M 8/04544 |
| | | | 307/87 |
| 2012/0250381 A1* | 10/2012 | Takahashi | H02M 1/4225 |
| | | | 363/124 |
| 2012/0326504 A1* | 12/2012 | Ballantine | H02J 3/006 |
| | | | 307/24 |

FOREIGN PATENT DOCUMENTS

| | | |
|---|---|---|
| DE | 102012110732 B3 | 6/2013 |
| EP | 1965482 B1 | 6/2010 |

\* cited by examiner

VOLTAGE CONTROL CIRCUIT FOR A FIELD DEVICE COUPLER

RELATED APPLICATIONS

This application claims the benefit of German Patent Application No. 10 2014 116 594.2 filed Nov. 13, 2014, the contents of which are incorporated herein by reference as if fully rewritten herein.

TECHNICAL FIELD

The present invention relates to a voltage control circuit having a voltage regulator without galvanic isolation for electrical connection to a field device coupler or as part of a field device coupler. The field device coupler is used in the case of a data bus, preferably a digital data bus, to couple at least one field device to a bus line. Communication is established during this process and electrical energy is supplied to the connected at least one field device via the field device coupler.

BACKGROUND

When field devices are to be connected to a bus line in areas at risk of explosion, explosion protection measures have to be taken. In the case of solutions known in practice, controlled or regulated bus voltage sources are used by way of example, which are connected to the bus line in order to supply energy to the entire data bus inclusive of the field device coupler and the field devices. Depending on the used field devices, the supply voltage across the bus line must be limited here to 17.5 V (field devices according to FISCO) or to 24 V (field device according to ENTITY classification). The permissible line lengths of the bus line are thus severely limited in turn.

In order to obtain inherently safe electrical circuits for an area at risk of explosion, DE 199 10 409 A1 suggests connecting a field bus distributor to the field device coupler on the output side. This field bus distributor has means for current limitation and means for voltage limitation, such that inherently safe connections are achieved there for field devices. Resistors are used for current limitation. The voltage limitation is effected via Zener diodes. A short-circuit current, which trips the fuses, is created via the Zener diodes by overvoltages.

Another solution for areas at risk of explosion is known from EP 1 965 482 B1. The bus line is divided there into galvanically isolated bus line portions supplied separately from one another. A signal transmission with direct components between the bus line portions is prevented by the galvanic isolation. Communication signals having an alternating component are transmitted between the bus line portions. This solution, however, is complex and costly. It requires a large number of energy supply units for each bus line termination and a galvanic isolation means (for example transmitter) between each two bus line portions.

SUMMARY

The problem addressed by the present invention can therefore be considered that of creating a possibility for coupling field devices to a bus line via inherently safe electrical circuits, this possibility being provided easily and economically.

The voltage control circuit for electrical connection to a field device coupler or as part of a field device coupler has a first input terminal and a second input terminal. The voltage control circuit can be connected via both input terminals in each case to a conductor of a bus line. The bus line is preferably embodied as a two-core bus line having two conductors or cores. It may correspond for example to a standard, such as Profibus standard PA, ASI, LON or Foundation Fieldbus H1.

The voltage control circuit is embodied as a voltage regulator without galvanic isolation. It produces an electrical coupling between the conductors of the bus line and the field device coupler and has a voltage regulator in the form of a chopper-type regulator having at least one activated switch, which for example may be embodied as a step-down converter, as a step-up converter or as a DC-to-DC converter or synchronous converter. Such chopper-type regulators are available as standard components and have only a small power loss.

The voltage control circuit may be embodied as a separate module for electrical and optionally additionally for mechanical connection to a field device coupler or as part of the field device coupler.

The voltage control circuit preferably has a chopper-type regulator having a chopper-type converter input, which is connected to the first input terminal. An input voltage is applied to the chopper-type regulator input. It additionally has a chopper-type regulator output, at which it provides an output voltage, which is preferably of a lower value than the input voltage. In addition, the chopper-type regulator has a reference terminal. The output voltage can be controlled and/or regulated and/or is limited in particular to a maximum value.

The voltage control circuit or the chopper-type regulator additionally has buffer capacitors, of which one is connected between the reference terminal and the chopper-type regulator input and another is connected between the reference terminal and the chopper-type regulator output. The input voltage and the output voltage can be smoothed via a respective buffer capacitor. For an input current that flows to the first input terminal and has an alternating component, the buffer capacitors form a parallel path between the chopper-type regulator input and the chopper-type regulator output. Communication signals that are formed by modulation of the input current and have a frequency according to the used communication protocol are therefore transmitted past the voltage control circuit via this parallel path.

An impedance circuit is provided between the reference terminal and the second input terminal of the voltage control circuit. The impedance circuit ensures that communication signals having an alternating component which are applied across the input terminals are not short-circuited via the buffer capacitor (short-circuit connection between the two input terminals of the voltage control circuit). The impedance circuit is designed to produce, for a direct component of a voltage applied across the impedance circuit, an impedance of lower value than for an alternating component of this voltage. The reference terminal of the voltage control circuit can thus be connected for direct components via a low-resistance connection of the impedance circuit to the second input terminal, whereas the impedance circuit for alternating components produces a resistance of higher value and preferably a resistance that is as high as possible. A modulated alternating current as communication signal can thus be transmitted via the parallel path with the buffer capacitors. The desired reference potential is nevertheless provided to the voltage control circuit on account of the connection of the impedance circuit at the reference terminal, said connection being a low-resistance connection for direct components.

The field device coupler connected or connectable at the output terminals of the voltage control circuit has an output circuit. When an electrical connection has been produced between the voltage control circuit and the field device coupler the output circuit is connected to the output terminals of the voltage control circuit. It has at least one coupler output for connection of a bus branch line. The bus branch line is preferably embodied as a two-wire line, such that each output terminal is embodied with two poles accordingly.

A voltage regulation and consequently a voltage delimitation are thus performed in the voltage control circuit. The voltage regulation without galvanic isolation has low loss, in particular with the aid of a chopper-type regulator. Due to the parallel path via the buffer capacitors, an unhindered communication can be established at the same time via the field device coupler from the first input terminal thereof to the output circuit and consequently to the connected field devices.

The output circuit of the field device coupler preferably has at least one current limitation circuit. A separate current limitation circuit can be associated in each case with at least a plurality of coupler outputs. The electrical energy provided for the field devices can thus be controlled, regulated or limited by the voltage control circuit in conjunction with the voltage regulation. Inherently safe electrical circuits, in particular of inherently safe category "ic", can thus be connected to the at least one output terminal of the output circuit.

In one exemplary embodiment a shunt voltage limitation may additionally be provided, for example by at least one Zener diode or a thyristor circuit, and/or at least one safety fuse. The higher inherent safety categories "ib" and "ia" can also be achieved as a result. An ohmic current limitation is used for the category "ia". The voltage supply must meet the common conditions for the quality of the galvanic isolation. The potential freedom of the field bus line must be provided.

In a preferred embodiment the impedance circuit has an inductor or is formed by an inductor. In a simple embodiment of the impedance circuit no active components such as transistors or operational amplifiers are provided. The inductor has an impedance value that rises with increasing frequency and thus brings about the desired behaviour of the impedance circuit.

Due to the voltage regulation in the field device coupler, no certification in combination with a specially designed or voltage-reduced voltage source of the field bus is necessary with the use of the field device coupler for field devices that are arranged in areas at risk of explosion. The planning of the field bus is simpler and more transparent. Since the voltage source, which is connected to the bus line of the field bus, is not subject to any limitations in view of the protection against explosion, greater line lengths can also be provided. At the same time, electrical loses are minimised.

In a further preferred embodiment the impedance circuit has at least one active component, for example a bipolar transistor or a field-effect transistor.

The impedance circuit preferably has a gyratory behaviour. It can be constructed in a gyrator-like manner with a controlled component, preferably semiconductor component.

In a preferred embodiment the impedance circuit includes a series circuit having an impedance element and a capacitor. For example, an inductor or an ohmic resistor can be used as impedance element. The capacitor terminal or the centre tap of the series circuit is connected for example to the control input of a controlled component. A parallel branch can be connected parallel to the series circuit. The connection to the two terminals of the controlled component is in this case part of this parallel branch. In particular, a transistor is used as controlled component, which transistor is operated in the linear range and can therefore control the current flow component through the parallel branch. With respect to alternating components, the impedance element of the series circuit can provide a suitably high impedance value or resistance value, whereas direct components can be connected with low resistance or short-circuited via the parallel branch. The controlled component is activated by the voltage at the capacitor when charging the capacitor in the series circuit on account of the direct component.

There are preferably no components having an imaginary part of a complex resistance present in the parallel branch of the impedance circuit. An ohmic resistance value can be provided in the parallel branch.

The impedance element can be formed by an ohmic resistor and/or an inductor. The impedance element is preferably arranged in the series circuit upstream of the capacitor in the technical current flow direction of a direct current flowing through the impedance circuit. Here, the current flow direction of the direct current is predefined by the normal operation or by the predominantly occurring operating state.

The impedance circuit, in a number of preferred embodiments, has a predefined orientation in the sense that the direct current flows through the impedance circuit only or primarily in one direction through the impedance circuit. In this case a diode circuit having at least one diode may be provided in parallel. If current flows through the impedance circuit in the intended current direction, the diode circuit blocks and is ineffective. If the current direction through the impedance circuit reverses, the impedance circuit is protected against faulty polarisation in that it is bridged or short-circuited by the diode circuit. This is provided merely for transition states, for example at the start, since the high impedance desired for normal operation is then not provided.

Additionally or alternatively to the diode circuit, a rectifier circuit can be provided in series to the impedance circuit. The rectifier circuit may be embodied for example as a full-bridge rectifier circuit having four diodes. The current flow direction through the impedance circuit thus always remains correct, and the desired high impedance exists independently of the current direction of a current to the impedance circuit.

In a preferred embodiment the voltage control circuit may have an additional control input. A measurement voltage can be applied to this control input. It is thus possible to regulate the output voltage at the regulator output. Alternatively, the output voltage can also be detected and fed back to the voltage control circuit for regulation. The voltage control circuit may thus be embodied as a voltage regulator.

In one exemplary embodiment the measurement voltage can be generated by a voltage divider, which is arranged between the two output terminals of the voltage control circuit. In order to stabilise the voltage regulation, the measurement voltage can subjected to low-pass filtering or can be smoothed via a suitable filter circuit, for example a capacitor. This prevents superimposed communication signals from being regulated, which would lead to the undesirable suppression thereof.

Advantageous embodiments of the invention will emerge from the dependent claims, the description and the drawing. Preferred exemplary embodiment of the invention will be explained in detail hereinafter on the basis of the accompanying drawing, in which:

DETAILED DESCRIPTION

Figure 1:
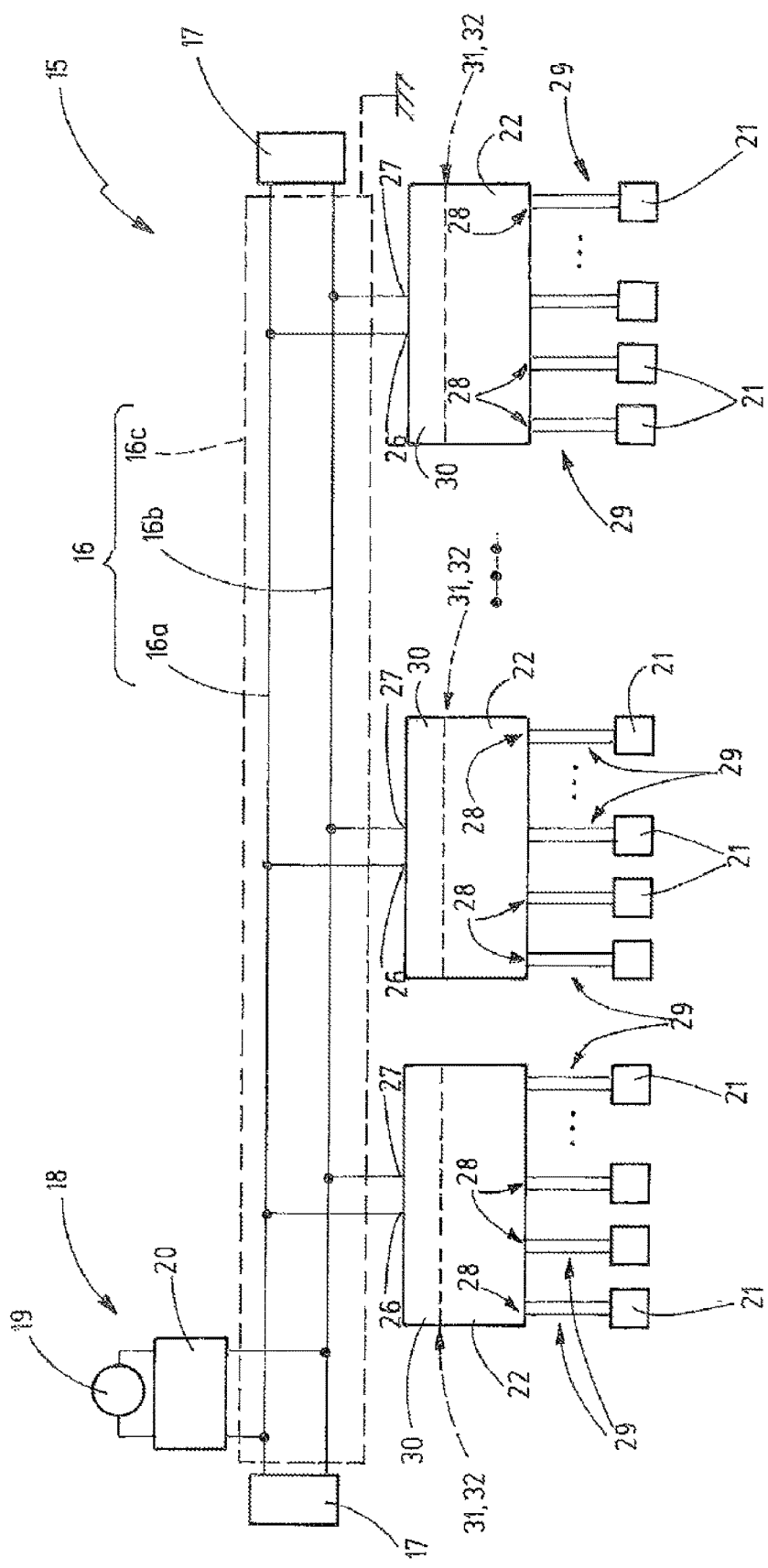
FIG. 1 shows a block diagram of an exemplary embodiment of a bus communication apparatus.

A block diagram of a bus communication apparatus 15 is illustrated in FIG. 1. The bus communication apparatus 15 has a bus line 16, which in the exemplary embodiment is embodied as a two-core line and therefore has a first conductor 16a and a second conductor 16b. The bus line 16 is terminated at both ends by a line termination 17. The conductors 16a, 16b of the bus line 16 may be twisted.

A voltage supply 18 having a DC voltage source 19 is connected to the bus line 16. The voltage supply 18 serves to supply the subscribers connected to the bus line 16 with electrical energy. The voltage supply 18 may have an intermediate circuit 20, which contains means for blocking communication signals having an alternating component with respect to the DC voltage source 19 in order to prevent interference with the communication by the DC voltage source 19. By way of example, the intermediate circuit 20 may have one or more inductors. The bus line 16 may have a grounded screening 16c for screening against interference.

In order to control the bus communication on the basis of a predefined communication protocol, a master computer or another communication control device can be connected to the bus line 16 (not illustrated).

One or more field devices 21 are connected via a field device coupler 22 to the bus line 16. A plurality of field device couplers 22 can be connected to the bus line 16.

Each field device coupler 22 is electrically coupled via a voltage control circuit 33 to the bus line 16. The voltage control circuit 33, in accordance with the example, is part of the field device coupler 22, but alternatively hereto could also be embodied as a separate module. The voltage control circuit 30 has a first input terminal 26, which is connected to the first conductor 16a, and a second input terminal 27, which is connected to the second conductor 16b of the bus line 16. The voltage control circuit 30 has a first output terminal 31 and a second output terminal 32 (FIG. 2a).

Each field device coupler 22 has a plurality of coupler outputs 28, which in accordance with the example are two-pole coupler outputs, to each of which a bus branch line 29 is connected, said bus branch line being a two-core line in accordance with the example and connecting the coupler output 28 in question to a field device 21.

Figure 2A:
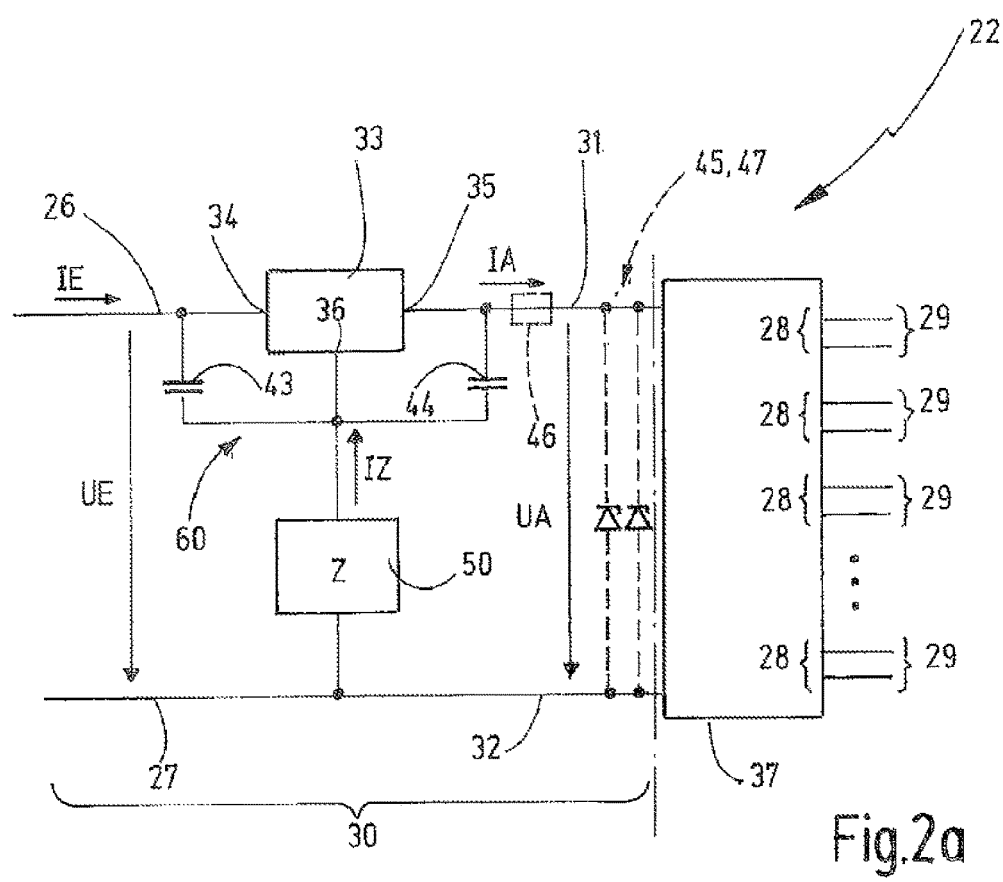
FIG. 2a shows a block diagram of an exemplary embodiment of an arrangement consisting of a voltage control circuit and a field device coupler from FIG. 1.

An exemplary embodiment of the field device coupler 22 and of the voltage control circuit 30 is illustrated in FIG. 2a. The voltage control circuit 30 in accordance with the example has a chopper-type regulator 33 having a chopper-type regulator input 34, a chopper-type regulator output 35 and a reference terminal 36. The chopper-type regulator input 34 is directly connected to the first input terminal 26. The chopper-type regulator output 35 forms the first output terminal 31. The second input terminal 27 is directly connected to the second output terminal 32.

Figure 2B:
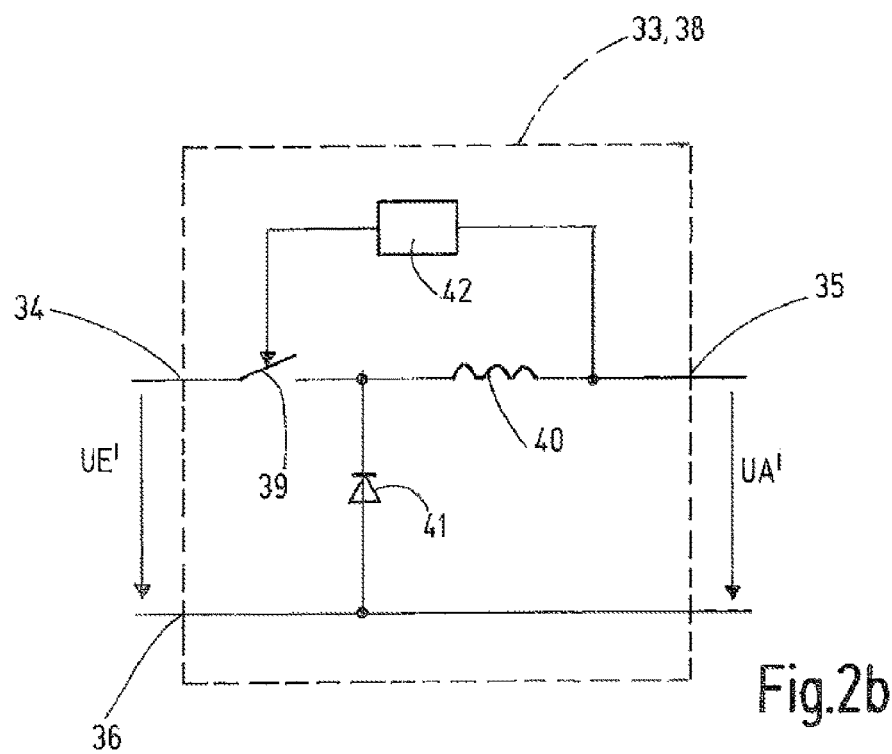
FIG. 2b shows a block diagram of an exemplary embodiment of a voltage control circuit of the field device coupler from FIG. 2a, FIG. 3 shows the frequency-dependent characteristic of an impedance of an exemplary embodiment of an impedance circuit of the field device coupler from FIG. 2a, FIGS. 4 to 6 each show a basic circuit diagram of an exemplary embodiment of an impedance circuit.

The two output terminals 31, 32 of the voltage control circuit 30 are connected to an output circuit 37 of the field device coupler 22. An output voltage UA provided by the voltage control circuit 30 is applied to the output circuit 37 between the two output terminals 31, 32. An input voltage UE is applied between the first input terminal 26 and the second input terminal 27. The voltage control circuit 30 converts the input voltage UE into an output voltage UA, wherein it must be noted that the chopper-type regulator 33 used in accordance with the example regulates the voltages UA', UE' at the chopper-type regulator input 34 thereof and at the chopper-type regulator output 35 thereof in each case on the basis of the potential at the reference terminal 36 (FIG. 2b). The input voltage UE and the output voltage UA are thus additionally dependent on the potential applied to the reference terminal.

The voltages at the chopper-type regulator input 34 and chopper-type regulator output 35 are preferably DC voltages. The value of the output voltage UA in the exemplary embodiment is smaller than the value of the input voltage UE.

As is illustrated schematically in FIG. 2b, the voltage control circuit 30 has the chopper-type regulator 33 as a voltage regulator. In the illustrated exemplary embodiment the chopper-type regulator 33 is formed by a step-down converter 38. Instead of the step-down converter illustrated here, other DC voltage converter topologies could also be used, such as a step-up converter.

The step-down converter 38 illustrated by way of example in FIG. 2b has a controlled converter switch 39, which is connected to the chopper-type regulator input 34. A converter inductor 40 is connected in series to the converter switch 39 and connects the converter switch 39 to the chopper-type regulator output 35. The connection point between the converter switch 39 and the converter inductor 40 is connected via a converter diode 41 to the reference terminal 36. Here, the anode of the converter diode 41 is connected to the reference terminal 36. A converter control circuit 42 serves to generate an activation signal for the converter switch 39 in order to provide the predefined output voltage UA at the chopper-type regulator output 35.

The voltage control circuit 30 consequently provides, between its output terminals 31, 32, a voltage UA and an output current IA flowing to the output circuit 37. An input current IE flows across the first input terminal 26 and an input voltage UE is applied, which is converted into an output voltage UA. The output voltage UA provided for the subscriber units 21 is thus limited to the value provided by the voltage control circuit 30 and is controlled or regulated in accordance with the example. This voltage conversion is embodied without loss by the chopper-type regulator 33, for example as a step-down converter 38.

A first buffer capacitor 43 is connected between the chopper-type regulator input 34 and the reference terminal 36, and a second buffer capacitor 44 is connected between the chopper-type regulator output 35 and the reference terminal 36. The buffer capacitors 43, 44 may be embodied as electrolytic capacitors (FIG. 2a).

Figure 3:
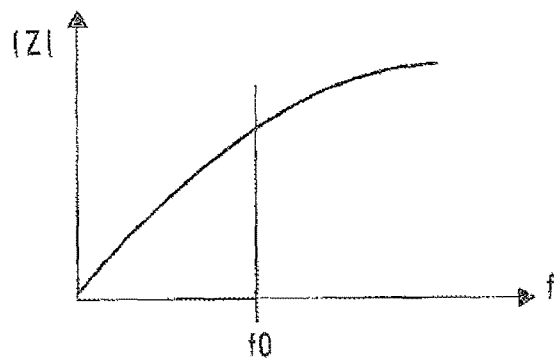

The reference terminal 36 is connected via an impedance circuit 50 to the second input terminal 27. An impedance Z is caused via the impedance circuit 50, the value of said impedance for a direct component in the input voltage UE or in the input current IE flowing into the first input terminal 26 being low and the value of said impedance with a higher frequency for an alternating component in the input voltage UE or in the input current IE being greater. The impedance circuit 50 thus has a frequency-dependent complex resistance, of which the value for an alternating component is greater than for a direct component. In the ideal case the value of the impedance Z for a direct component is equal to zero (FIG. 3).

Due to an additional shunt voltage limitation 45 of the voltage control circuit 30 parallel to the output terminals 31, 32 and a fuse, in particular a safety fuse 46 in the output terminal 31, 32, the higher inherent safety categories "ib" and "ia" can also be provided. The shunt voltage limitation 45 is provided in accordance with the example by a Zener diode circuit 47 having one or more Zener diodes connected in parallel. Alternatively, a thyristor circuit may also be used.

Figure 12:
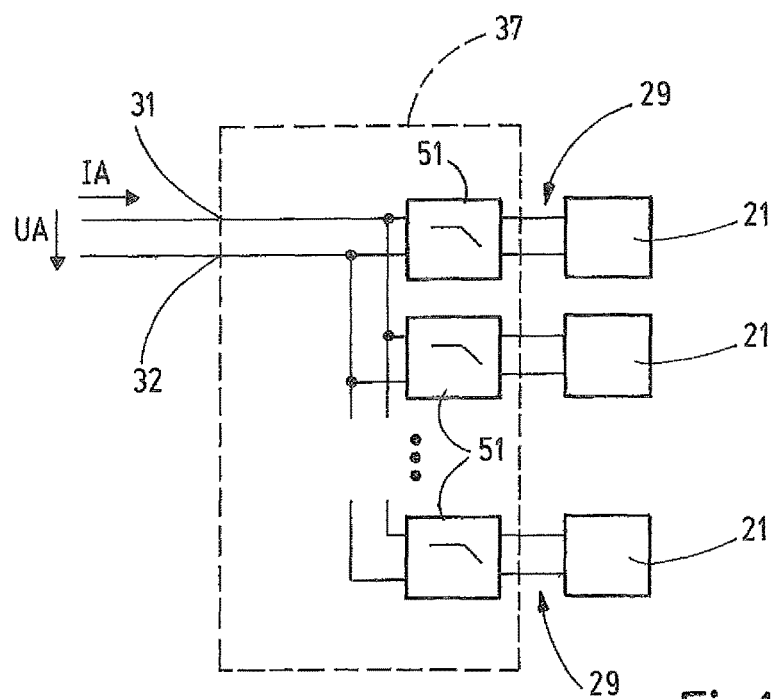
FIG. 12 shows a block diagram of an output circuit having a plurality of current limitation circuits of any exemplary embodiment of the field device coupler.

At least one current limitation circuit 51 may be provided for one or more coupler outputs 28 in the output circuit 37 of the field device coupler 22. In the exemplary embodiment each coupler output 28 is connected to the output terminals 31, 32 via a separate current limitation circuit 51 (FIG. 12).

Figure 13:
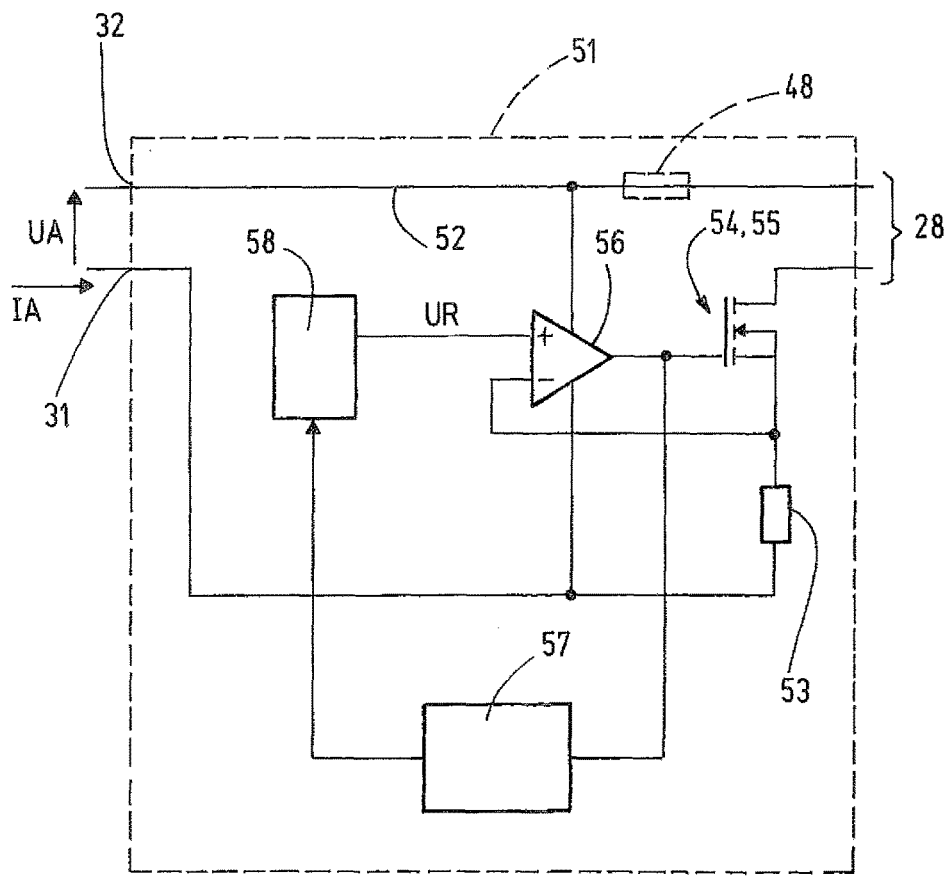
FIG. 13 shows a block diagram of a current limitation circuit for the output circuit according to FIG. 12.

An exemplary embodiment for a current limitation circuit 51 is illustrated in FIG. 13. As illustrated, the second output terminal 32 in the current limitation circuit 51 is connected via a connection line 52 directly to a pole of the coupler output 28. The first output terminal 31 of the field device coupler 22 is connected via a measuring resistor 53 and a controlled semiconductor element 54 to the other pole of the coupler output 28. The controlled semiconductor element 54 is formed in accordance with the example by a control transistor 55, which is embodied here as a MOSFET. The drain-source connection thereof is connected in series to the measuring resistor 53.

The control input of the controlled semiconductor element 54 is connected to the output of an operational amplifier 56. The inverting input of the operational amplifier 56 is connected to the connection point between the measuring resistor 53 and the control transistor 55. The voltage output at the output of the operational amplifier 56 is transmitted to a voltage control unit 57, which activates a reference voltage source 58. The reference voltage source 58 generates a reference voltage UR, which is fed to the non-inverting input of the operational amplifier 56. Depending on the voltage applied at the measuring resistor 53, the output value of the operational amplifier 56 changes and in turn influences the current flowing through the drain-source connection of the control transistor 55. In this way, the current at the coupler output 28 for a connected subscriber unit 21 can be regulated or limited.

This voltage control is not absolutely necessary for the current limitation and is therefore optional. It additionally makes it possible to reduce the current in the case of the limitation.

In order to achieve the inherent safety category "ia" the current limitation circuit 51 additionally and optionally may have an ohmic current limitation resistor 48, which is arranged in accordance with the example between the second output terminal 32 and the associated pole of the coupler output 28. The current limitation resistor 48 may also be arranged in the connection to the first output terminal 31 and the associated pole of the coupler output 28.

It goes without saying that other suitable current limitation circuits 51 could also be used.

The field device coupler 22 thus performs a current limitation and, in combination with the voltage control circuit 30, a voltage regulation. The electrical energy provided to a subscriber unit 21 can thus be limited or regulated. When the subscriber units 21 are arranged in an area at risk of explosion, the electrical energy provided at a coupler output 28 can be limited to a maximum value, which corresponds to the "inherent safety" ignition protection type, in particular in category "ic" or also categories "ia" or "ib". Further means for current limitation or for voltage regulation are not necessary and can be omitted. Due to the combination of the field device coupler 22 with the voltage control circuit 30 integrated in accordance with the example, the voltage supply 18 of the bus communication apparatus 15 can be provided as usual without particular voltage limitation function. In particular, the voltage supply 18 may also provide greater DC voltage values compared with those suitable for the "inherent safety" ignition protection type. The maximum line length of the bus line 16 therefore is not reduced or is only slightly reduced compared with field buses not protected against explosion.

The communication signals are generated by modulation of the current, which therefore has rising and falling flanks between the digital values HIGH and LOW, in order to transmit information. The input current IE thus contains alternating current components, which are transferred through a parallel path 60, which connects the chopper-type regulator input 34 to the chopper-type regulator output 35. This parallel path 60 is formed by a series connection of the two buffer capacitors 43, 44. The buffer capacitors 43, 44 are dimensioned in such a way that they do not constitute a significant impedance value for the alternating current component for the bus communication. The voltage control circuit 33 therefore does not interfere with the communication. The alternating current communication signals are transmitted via the parallel path 60 past the voltage control circuit 33 to the output circuit 37 and from there to the subscriber units 21 or vice versa.

The impedance circuit 50 of the voltage control circuit 30 is connected to the reference terminal 36 of the chopper-type regulator 33 and therefore to the parallel path 60. So as not to interfere with the communication signals, the impedance circuit 50 provides an accordingly high value of the impedance Z for the frequencies used in the communication. Direct components between the reference terminal 36 and the first input terminal 27 are in turn connected with low resistance or short-circuited in order to provide the reference potential of the second input terminal 27 to the chopper-type regulator 33 and in accordance with the example to the step-down converter 38 at the reference terminal 36.

Figure 7:
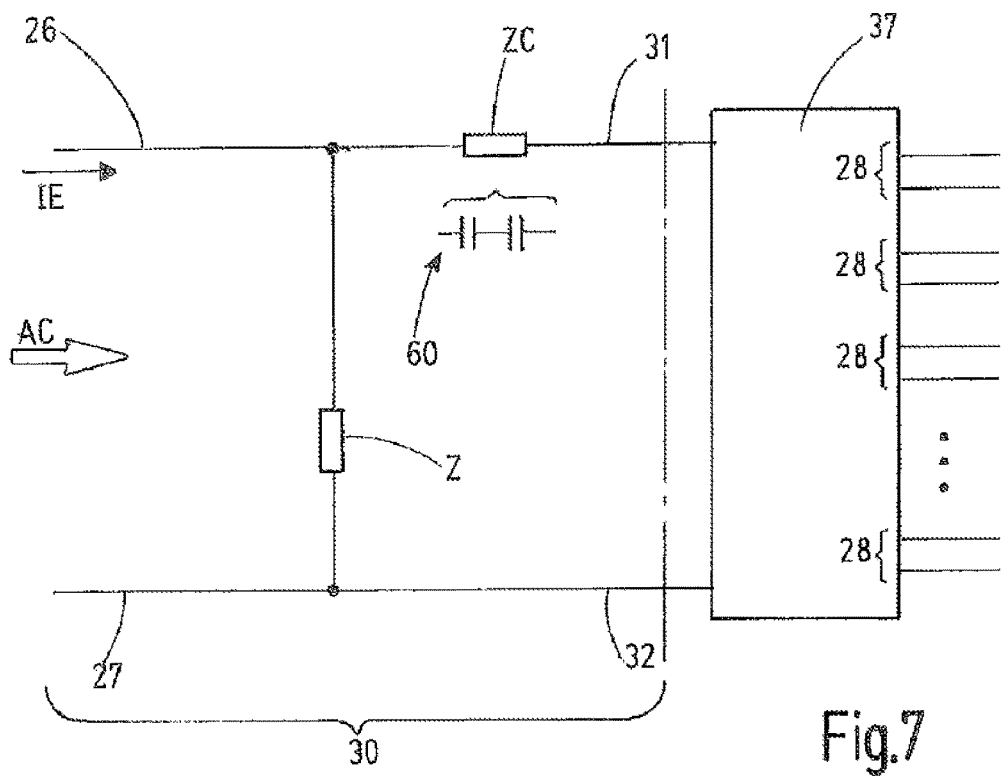
FIG. 7 shows an equivalent circuit diagram of the voltage control circuit from FIG. 2a for an alternating component of the input voltage or input current.
Figure 8:
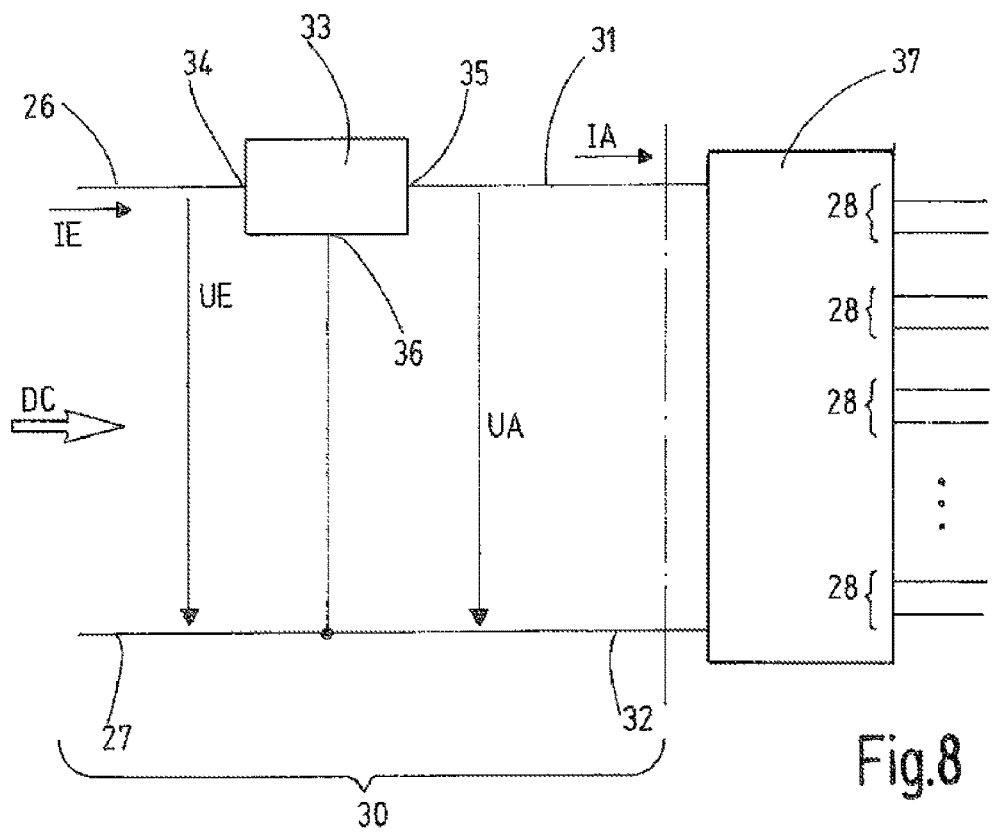
FIG. 8 shows an equivalent circuit diagram of the voltage control circuit from FIG. 2a for a direct component of the input voltage or input current, FIGS. 9 to 11 each show a block diagram of a further modified exemplary embodiment of the arrangement illustrated in FIG. 2a formed from voltage control circuit and field device coupler.

The described function is illustrated schematically in the equivalent circuit diagrams of FIGS. 7 and 8. FIG. 7 shows the equivalent circuit diagram of the voltage control circuit 30 for the alternating components of the input current IE. The impedance Z here is much greater in terms of value than the equivalent impedance ZC of the parallel path 60, which in accordance with the example is not negligible and of which the value decreases inversely proportionally to the frequency of the alternating components. The alternating components necessary for communication are therefore transmitted from the first input terminal 26 to the first output terminal 31 and then to the output circuit 37.

FIG. 8 shows the equivalent circuit diagram for the DC components at the first input terminal 26. The buffer capacitors 43, 44 have an infinitely high impedance value for direct components, such that the parallel path 60 is spared in the equivalent circuit diagram according to FIG. 8. The value of the impedance Z is minor or equal to zero for low frequencies. The reference terminal 36 of the chopper-type regulator 33 is therefore connected directly to the input terminal 27.

The primary course of the frequency-dependent value of the impedance Z is illustrated in FIG. 3. The correlation between the frequency and the value of the impedance Z is not linear in accordance with the example, and in contrast hereto could also follow a linear course. In any case, it is key that the value of the impedance Z at a frequency f0 used for communication is sufficiently great so as not to influence the communication, and for direct components is as low as possible in order to keep losses low.

Figure 4:
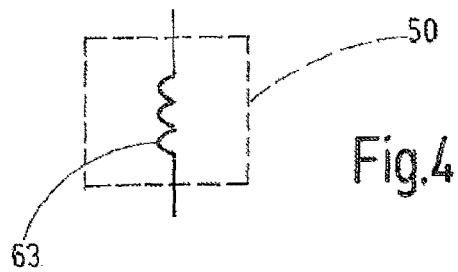
Figures 5, 6:
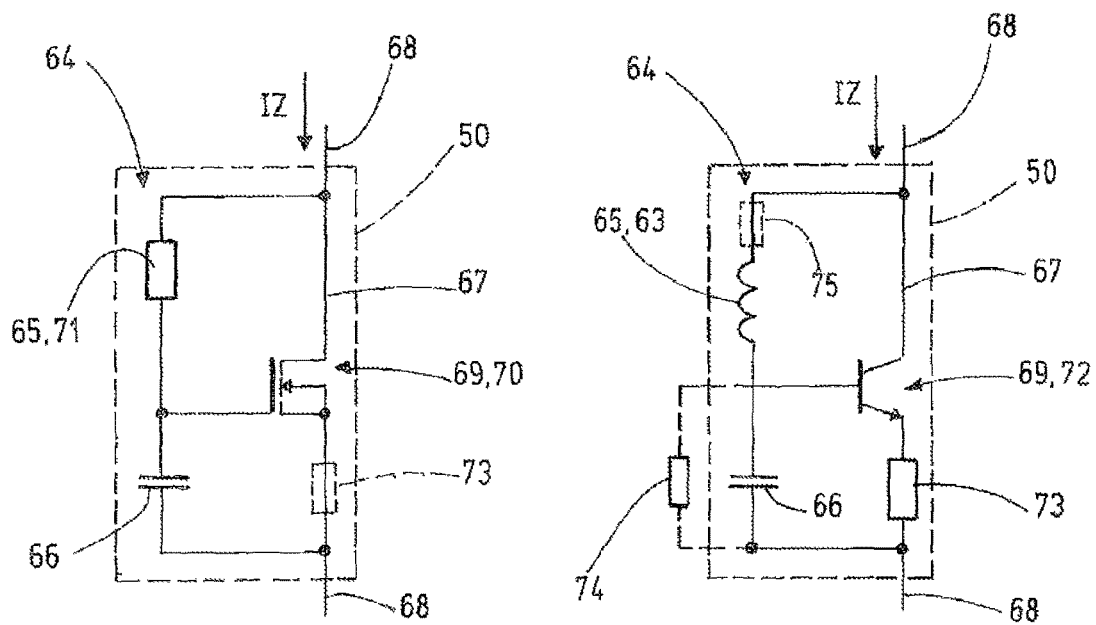

Exemplary embodiments for producing the impedance circuit 50 are illustrated in FIGS. 4 to 6. In the simplest case the impedance circuit 50 can be formed by an inductor 63, as is illustrated in FIG. 4. An inductor 63 has the value of the impedance Z increasing with the frequency f and consequently has the desired characteristic. However, a direct current IZ also flows through the impedance circuit 50. Depending on the value of this direct current IZ through the impedance circuit 50, it may therefore be necessary to use large and consequently costly inductors.

In order to avoid costly inductors, an impedance circuit 50 having a gyrator characteristic can also be used. An example for this is illustrated in FIG. 5. In the exemplary embodiment according to FIG. 5 the impedance circuit 50 has a series circuit 64 formed from an impedance element 65 and a capacitor 66. The impedance element 65 is formed by way of example by a first ohmic resistor 71. A parallel branch 67 is connected parallel to this series circuit 64. The parallel branch 67 and the series circuit 64 are connected at each of their two ends to a terminal 68 of the impedance circuit 50. The impedance circuit 59 additionally has a controlled component 69, which is formed in accordance with the example by a field-effect transistor 70. The control input of the controlled component 69 is connected to the centre tap of the series circuit 64 formed from the capacitor 66 and the impedance element 65. The connection controllable and/or switchable by the controlled component 69, i.e. the drain-source connection in accordance with the example, is part of the parallel branch 67. A second ohmic resistor 73 may be arranged optionally in the parallel branch 67, at the source terminal of the field-effect transistor 70 in accordance with the example.

The impedance circuit 50 according to FIG. 5 functions as explained hereinafter.

The position of installation of the impedance circuit 50 according to FIG. 5 is selected in such a way that the direct current IZ flowing through the impedance circuit 50 in the normal operating state when the controlled component 69 is blocked flows firstly through the impedance element 65 and then through the capacitor 66. The direct current IZ here charges the capacitor 66 until a sufficiently high voltage is applied to the control input of the control component 69 in order to switch over the control components 69 into the conductive state.

If the controlled component 69 is conductive, a connection is produced through the parallel branch 67 between the terminals 68 and only some of the current flows through the series circuit 64, whereas another, greater portion of the current flows through the parallel branch having the controlled component 69. A low-resistance connection can thus be produced between the terminals 68 for a direct current or direct current component and in accordance with the example the direct current IZ. If the current changes, the capacitor 66 charges or discharges and the conductivity of the control component 69 likewise changes, such that the impedance circuit at the terminals 68 simulates the function of a coil, but without having to use coils, which are costly. The impedance circuit 50 according to FIG. 5 constitutes a corresponding impedance Z for the alternating current.

A further exemplary embodiment of the impedance circuit 50 is illustrated in FIG. 6. There, an inductor 63 is connected in series to the capacitor 66 in the series circuit 64. A third ohmic resistor 74 may optionally be connected parallel to the capacitor 66 and/or a fourth ohmic resistor 75 may be connected in series to the inductor 63. Instead of the field-effect transistor 70, a bipolar transistor 72 is used as control component 69. The second ohmic resistor 73 is arranged in the parallel branch 67 in series to the controlled component 69 and is connected in accordance with the example to the emitter of the bipolar transistor 72. The operating principle of the impedance circuit 50 according to FIG. 6 is as follows:

The bipolar transistor 72 is operated in a collector circuit (as emitter follower). The capacitor 66 is charged by a direct current IZ and the bipolar transistor 72 is conductive. Due to the current amplification of the bipolar transistor 72, only merely a negligible portion of the direct current flows into the series circuit 64, and practically the entire direct current IZ flows through the parallel branch 67. The second ohmic resistor 73 is relatively small, preferably in the ohm range. The inductor 63 forms a great impedance Z for an alternating current or alternating components. The base current and therefore also the emitter current thus may not change quickly by an alternating current or alternating components. The impedance circuit 50 according to FIG. 6 amplifies the direct current through the inductor 63. The direct current loading of the inductor is therefore low, such that a compact and economical design can be used.

As illustrated in FIGS. 2a and 9 to 11, a direct current IZ generally flows through the impedance circuit 50 to the reference terminal 36 of the chopper-type regulator 33. This is to be attributed to the fact that the input current IE in the chopper-type regulator input 34 is usually smaller than the output current IA from the chopper-type regulator output 35 when the voltage is reduced. The voltage control circuit 30 is designed accordingly for this operating state, and the position of installation of the impedance circuit 50 is selected accordingly, provided this plays a role depending on the embodiment. The current flow direction is specified for the exemplary embodiments of the impedance circuits in the embodiments according to FIGS. 5 and 6.

Figure 9:
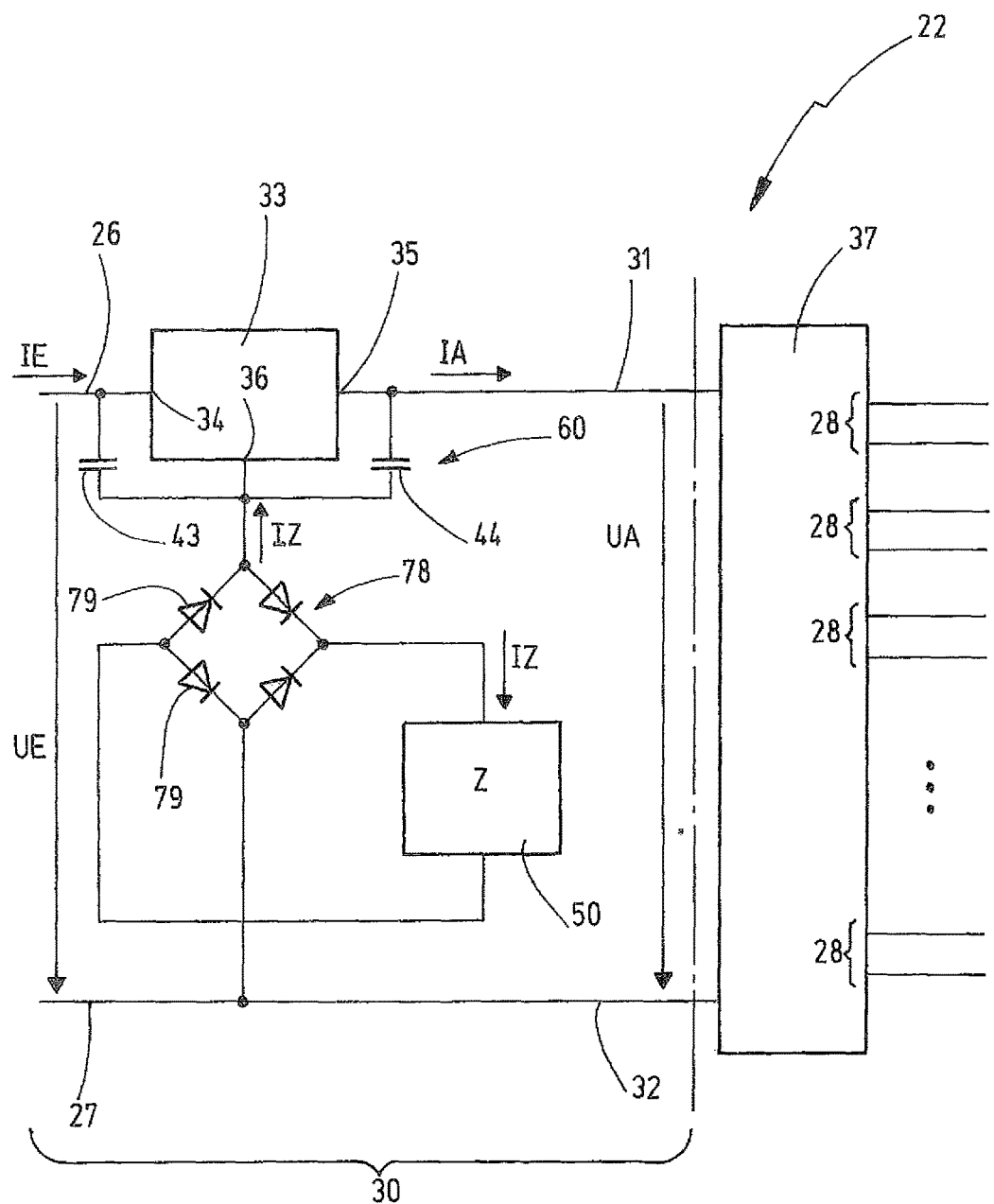

An exemplary embodiment of the voltage control circuit 30 is illustrated in FIG. 9, in which the impedance circuit 50 is arranged downstream of a rectifier circuit 78. The rectifier circuit 78 is embodied as a full-bridge rectifier having four rectifier diodes 79. A direct current IZ may therefore flow through the impedance circuit 50 only in a predefined flow direction. As explained, the direct current IZ usually flows in the direction of the reference terminal 36. Should a heavily reduced current uptake of the connected field devices 21 result from an operating state deviating from the normal operation or from the predominant operating state, and should the output current IA thus fall below the input current IE, the direct current IZ thus no longer flows into the chopper-type regulator 33, but flows from the chopper-type regulator 33 in the direction of the second input terminal 27. The flow of current through the impedance circuit 50, however, remains in the same direction due to the rectifier circuit 78. As illustrated in FIG. 9, the direct current IZ between the second input terminal 27 and the reference terminal 36 flows first through one of the rectifier diodes 79, then through the impedance circuit 50 and again through one of the rectifier diodes 79.

Figure 10:
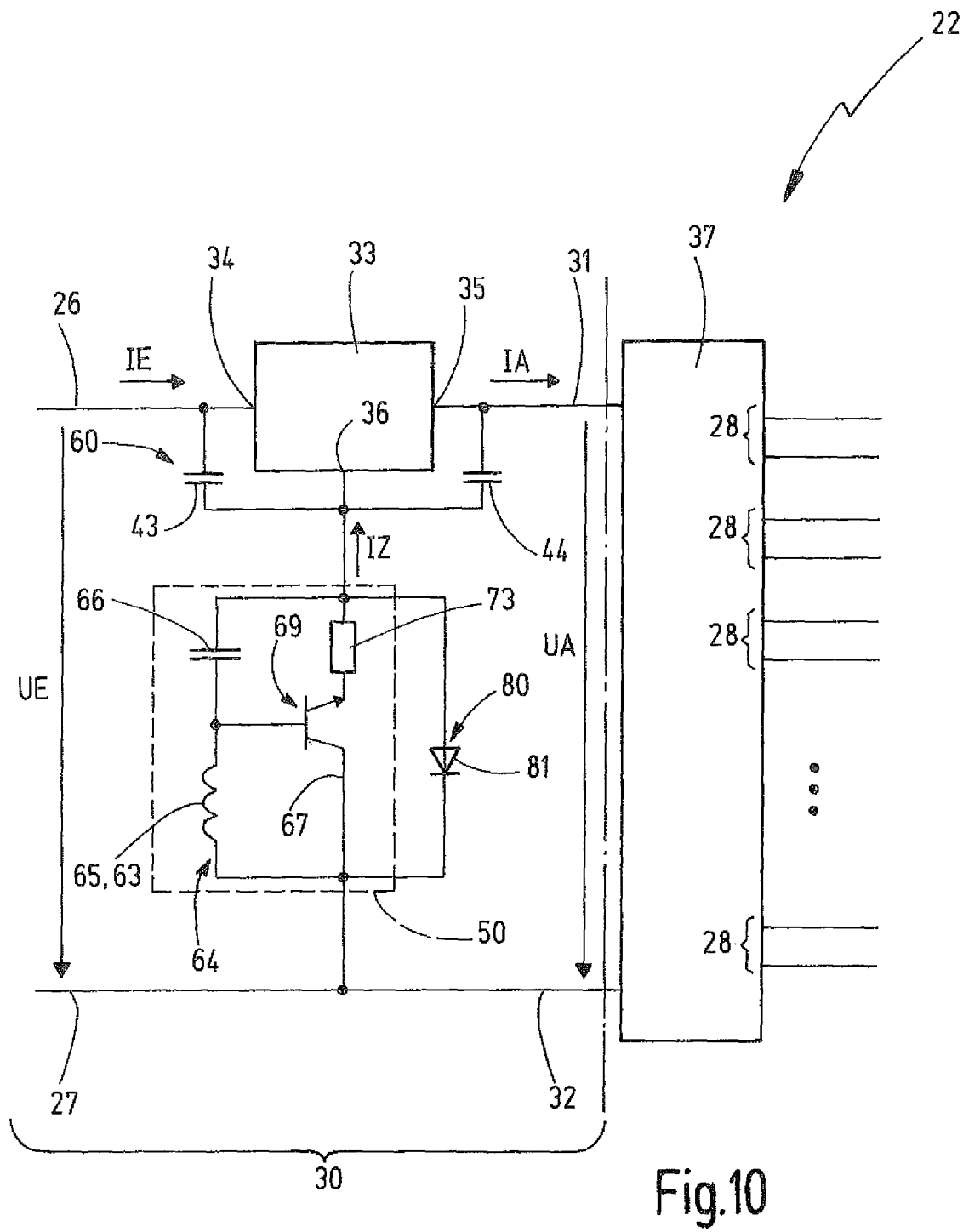

FIG. 10 shows a further exemplary embodiment of the voltage control circuit 30 or of the field device coupler 22 in an embodiment that is simplified compared with FIG. 9. If there is no reversal of the current flow direction of the direct current IZ through the impedance circuit 50 during normal operation of the field device coupler 22, it is possible to dispense with the rectifier circuit 78 from FIG. 9. When an exemplary embodiment that can operate merely in one current flow direction of the direct current IZ is used for the impedance circuit 50, a diode circuit 80 can be connected parallel to the impedance circuit, said diode circuit having in the simplest embodiment merely one diode 81. Here, the diode 81 is oriented in such a way that it blocks the current flow direction of the direct current IZ through the impedance circuit 50 prevailing during normal operation. Should the current flow direction reverse in an unusual operating state, for example during switch-on, the diode circuit 80 bridges the impedance circuit 50 and protects it against faulty polarisation.

It goes without saying that in embodiments of the impedance circuit 50 that are equally functional irrespective of the current flow direction of the direct current IZ, a rectifier circuit 78 or a diode circuit 80 can be omitted. If, by way of example, in the simplest case merely one inductor 63 is used for the impedance circuit 50 (FIG. 4), additional measures of this type are not necessary.

Figure 11:
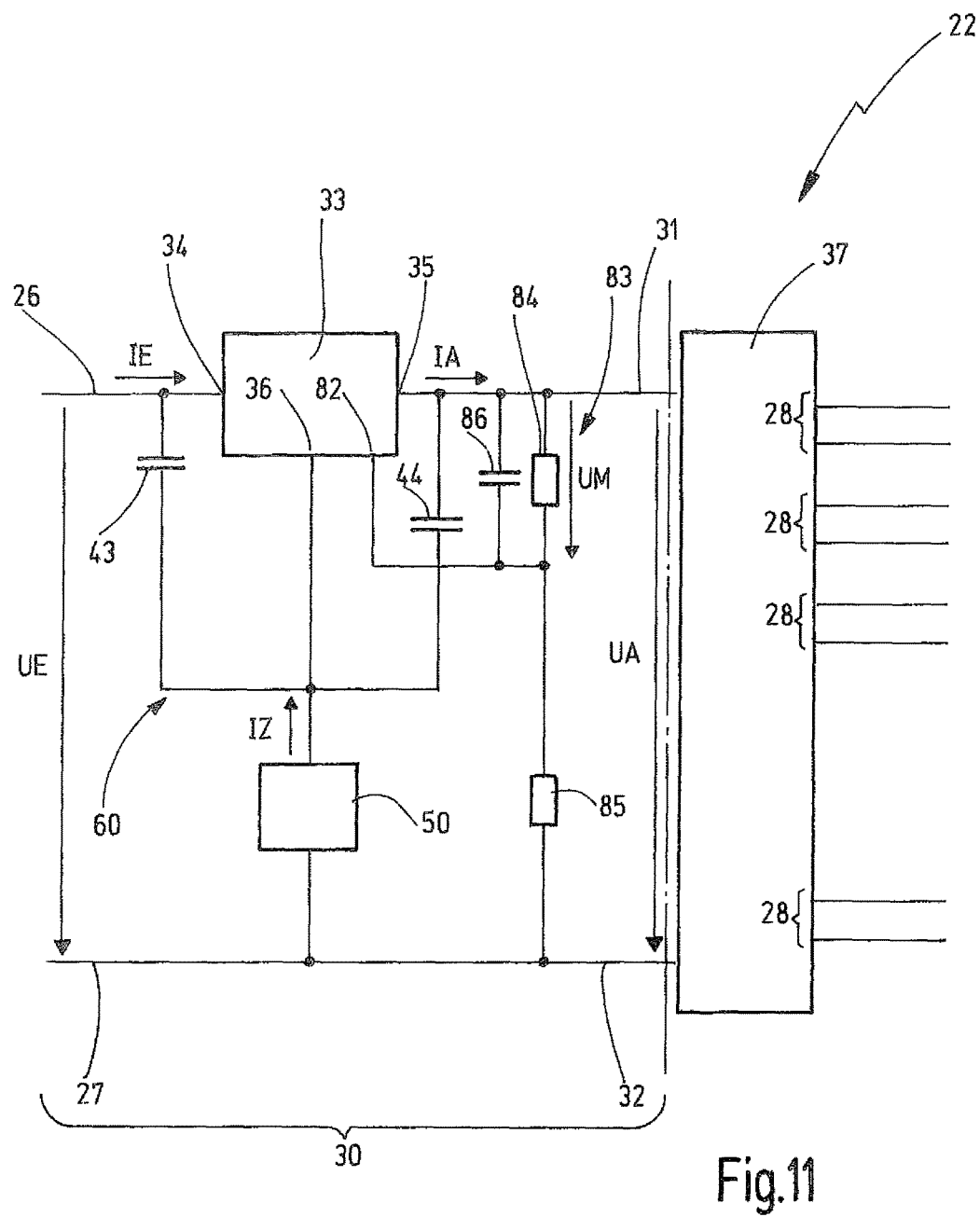

A further exemplary embodiment of the field device coupler 22 or of the voltage control circuit 30 is illustrated in FIG. 11. In this exemplary embodiment the impedance circuit 50 can be described in accordance with one of the preceding embodiments. It is also possible to additionally provide the rectifier circuit 78 or the diode circuit 80. In the exemplary embodiment according to FIG. 11 the chopper-type regulator 33 has an additional control input 82, to which a measurement voltage UM is applied. The measurement voltage UM can be generated in different ways. In the exemplary embodiment a voltage divider 83 having two voltage divider resistors 84, 85 connected in series is connected for this purpose between the first output terminal 31 and the second output terminal 32. The measurement voltage UM is tapped at the first voltage divider resistor 84 connected to the first output terminal 31 and the control input 82 and is transmitted to the control input 82. A smoothing capacitor 86 is connected to the control input 82 and is connected parallel to the first voltage divider resistor 84. The smoothing capacitor 86 serves to compensate for fluctuations of the measurement voltage UM in order to free the measurement voltage UM fed to the chopper-type regulator 33 at the control input 82 of higher-frequency changes. This prevents superimposed communication signals from being regulated, which would lead to the undesired suppression thereof. Instead of the smoothing capacitor 86, other filter circuits with low-pass characteristic could also be used. The measurement voltage UM characterises the output voltage UA. This measurement voltage can be fed by way of example to the converter control circuit 42 instead of the direct output voltage UA in order to adjust the converter circuit 39 for adjusting the desired output voltage UA in the event of fluctuations caused by a changing load.

The invention relates to a voltage control circuit 30 for the electrical coupling of a field device coupler 22 to a bus line 16. The field device coupler 22 has at least one coupler output 28 for connecting one or more field devices 21 via in each case a bus branch line 29. Each coupler output 28 is preferably associated with a current limitation circuit 51. The voltage control circuit 30 is integrated in the field device coupler 22 or is embodied as a separate module. An input voltage UE provided at the voltage control circuit 30 from the bus line 16 is converted into an output voltage UA. The output voltage UA provided for the coupler outputs 28 can thus be regulated and consequently limited. If a current limitation is additionally provided, the "inherent safety" ignition protection type can be achieved for the field devices 21 connected to the coupler outputs 28. The voltage control circuit 30 has a chopper-type regulator 33 without galvanic isolation. A parallel path 60 is formed parallel to a chopper-type regulator 33 by a series connection of two buffer capacitors 43, 44. Communication signals of higher frequency are transferred past the chopper-type regulator 33 via the parallel path 60. The parallel path 60 and a reference terminal 36 of the chopper-type regulator 33 are additionally connected via an impedance circuit 50 to a reference potential at a second input terminal 27 of the voltage control circuit 30. The impedance circuit 50 provides a low-resistance connection or a short-circuit connection for direct components and a connection with an impedance Z of higher value for alternating components.

LIST OF REFERENCE SIGNS 15 bus communication apparatus
16 bus line
16a first conductor
16b second conductor
16c screening
17 line termination
18 voltage supply
19 DC voltage source
20 intermediate circuit
21 field device
22 field device coupler
26 first input terminal of the voltage control circuit
27 second input terminal of the voltage control circuit
28 coupler output
29 bus branch line
30 voltage control circuit
31 first output terminal
32 second output terminal
33 chopper-type regulator
34 chopper-type regulator input
35 chopper-type regulator output
36 reference terminal
37 output circuit
38 step-down converter
39 converter switch
40 converter inductor 41 converter diode
42 converter control circuit
43 first buffer capacitor
44 second buffer capacitor
45 shunt voltage limitation
46 safety fuse
47 Zener diode arrangement
48 current limitation resistor
50 impedance circuit
51 current limitation circuit
52 connection line
53 measuring resistor
54 controlled semiconductor element
55 control transistor
56 operational amplifier
57 voltage control unit
58 reference voltage source
60 parallel path
63 inductor
64 series circuit
65 impedance element
66 capacitor
67 parallel branch
68 terminal of the impedance circuit
69 controlled component
70 field-effect transistor
71 first ohmic resistor
72 bipolar transistor
73 second ohmic resistor
74 third ohmic resistor
75 fourth ohmic resistor
78 rectifier circuit
79 rectifier diode
80 diode circuit
81 diode
82 control input
83 voltage divider
84 voltage divider resistor
85 voltage divider resistor
86 smoothing capacitor
IA output current
IE input current
IZ direct current through impedance circuit
UA output voltage
UE input voltage
UM measurement voltage
UR reference voltage
Z impedance
ZC equivalent impedance

What is claimed is:

1. An apparatus comprising a voltage control circuit (30) for coupling a field device coupler (22) to a bus line (16), wherein at least one field device (21) can be connected to the field device coupler (22), the voltage control circuit comprising:
a first input terminal (26) and a second input terminal (27), which are designed for connection to in each case a conductor (16a, 16b) of the bus line (16),
a chopper-type regulator (33) without galvanic isolation, which has a chopper-type regulator input (34) connected to the first input terminal (26), a chopper-type regulator output (35), and a reference terminal (36),
buffer capacitors (43, 44), of which one is provided between the reference terminal (36) and the chopper-type regulator input (34) and another is provided between the reference terminal (36) and the chopper-type regulator output (35),
an impedance circuit (50), which connects the reference terminal (36) to the second input terminal (27) and which, for a direct component of a voltage applied to the impedance circuit (50), is designed to provide an impedance (Z) of lower value than for an alternating component of the voltage applied to the impedance circuit (50), and
output terminals (31, 32) for connection to an output circuit (37) of the field device coupler (22), between which an output voltage (UA) is provided,
wherein the impedance circuit (50) comprises a series circuit (64) having an impedance element (65) and a capacitor (66), wherein one capacitor terminal is connected to the control input of a controlled component (69), and wherein the controllable connection of the controlled component (69) is part of a parallel branch (67) to the series circuit (64).

2. The voltage control circuit according to claim 1, wherein the impedance circuit (50) comprises an inductor (63) or is formed by an inductor (63).

3. The voltage control circuit according to claim 1 wherein the impedance circuit (50) comprises at least one active component (69, 70, 72).

4. The voltage control circuit according to one of the preceding claims, wherein the impedance circuit (50) is configured to have a gyratory behaviour.

5. The voltage control circuit according to claim 1, wherein the parallel branch (67) in series to the controllable connection of the controlled component (69) is free from components having an imaginary part of a complex resistor.

6. The voltage control circuit according to claim 1, wherein the parallel branch (67) comprises an ohmic resistor (73).

7. The voltage control circuit according to claim 1, wherein the impedance element (65) is formed by an ohmic resistor (71) and/or an inductor (63).

8. The voltage control circuit according to claim 1, further comprising a diode circuit (80) connected in parallel to the impedance circuit (50) and short-circuits the impedance circuit (50) in a current flow direction not provided for normal operation.

9. The voltage control circuit according to claim 1, wherein the impedance circuit (50) is arranged downstream of a rectifier circuit (78).

10. The voltage control circuit according to claim 1, wherein the chopper-type regulator (33) has a control input (82), to which a measurement voltage (UM) describing the output voltage (UA) is applied.

11. The voltage control circuit according to claim 10, wherein the measurement voltage (UM) is generated at a voltage divider (83), which is connected between the first output terminal (31) and the second output terminal (32).

12. The apparatus of claim 1 further comprising field device coupler (22), which is connected to the output terminals (31, 32) of the voltage control circuit (30) and comprises at least one coupler output (28).

13. The apparatus according to claim 12, wherein the output circuit (37) comprises at least one current limitation circuit (51).

14. The apparatus according to claim 12, wherein the electrical power provided at the at least one coupler output (28) is limited to a maximum value.

15. The apparatus according to one of claims 12 to 14, wherein the voltage control circuit (30) is embodied as part of the field device coupler (22).

16. An apparatus comprising a voltage control circuit (30) for coupling a field device coupler (22) to a bus line (16), wherein at least one field device (21) can be connected to the field device coupler (22), the voltage control circuit comprising:
- a first input terminal (26) and a second input terminal (27), which are designed for connection to in each case a conductor (16a, 16b) of the bus line (16),
- a chopper-type regulator (33) without galvanic isolation, which has a chopper-type regulator input (34) connected to the first input terminal (26), a chopper-type regulator output (35), and a reference terminal (36),
- buffer capacitors (43, 44), of which one is provided between the reference terminal (36) and the chopper-type regulator input (34) and another is provided between the reference terminal (36) and the chopper-type regulator output (35),
- an impedance circuit (50), which connects the reference terminal (36) to the second input terminal (27) and which, for a direct component of a voltage applied to the impedance circuit (50), is designed to provide an impedance (Z) of lower value than for an alternating component of the voltage applied to the impedance circuit (50), and
- output terminals (31, 32) for connection to an output circuit (37) of the field device coupler (22), between which an output voltage (UA) is provided,
- a diode circuit (80) connected in parallel to the impedance circuit (50) and short-circuits the impedance circuit (50) in a current flow direction not provided for normal operation.

17. The apparatus according to claim 16, wherein the impedance circuit (50) is configured to have a gyratory behaviour.

18. The apparatus according to claim 16, wherein the impedance circuit (50) comprises a series circuit (64) having an impedance element (65) and a capacitor (66), wherein one capacitor terminal is connected to the control input of a controlled component (69), wherein the controllable connection of the controlled component (69) is part of a parallel branch (67) to the series circuit (64), and wherein the parallel branch (67) in series to the controllable connection of the controlled component (69) is free from components having an imaginary part of a complex resistor.

19. The apparatus according to claim 16, wherein the chopper-type regulator (33) has a control input (82), to which a measurement voltage (UM) describing the output voltage (UA) is applied.

20. The apparatus of claim 16 further comprising a field device coupler (22), which is connected to the output terminals (31, 32) of the voltage control circuit (30) and comprises at least one coupler output (28).

* * * * *